March 21, 1961 P. W. NIPPERT 2,975,659
BORING MACHINE OR SIMILAR MACHINE TOOL
Filed Sept. 24, 1958 3 Sheets-Sheet 1

INVENTOR.
PAUL W. NIPPERT
BY CORBETT, MAHONEY, MILLER
& RAMBO, ATTY'S.

INVENTOR.
PAUL W. NIPPERT
BY CORBETT, MAHONEY, MILLER
& RAMBO, ATTY'S.
BY

United States Patent Office 2,975,659
Patented Mar. 21, 1961

2,975,659

BORING MACHINE OR SIMILAR MACHINE TOOL

Paul W. Nippert, Columbus, Ohio, assignor to The Nippert Electric Products Company, Columbus, Ohio, a corporation of Ohio Filed Sept. 24, 1958, Ser. No. 763,073

6 Claims. (Cl. 77—3)

This invention relates to a boring machine or similar machine tool. It has to do, more particularly, with the means for supporting the movable head, such as the boring tool supporting head, of a machine tool of the type indicated.

At the present time, in machine tools of the general type indicated, it is customary to support the movable head, either the tool-supporting head or the non-supporting head, by guideways on the bed frame. These guideways are usually in the form of a plurality of accurately machined slots of V cross-section which extend longitudinally of the bed and which must be in precise parallel relationship. The guideways or slots receive complemental ribs on the slidable carriage, which also must be accurately machined to precisely fit the guide slots, and which must be accurately located relative to the guide slots and in precise parallel relationship so that they will cooperate therewith properly. Also, the mechanism now commonly used for moving the sliding carriages of machine tools are complicated and expensive, since they require many expensive machined parts that must be precisely fitted together.

It is one of the objects of this invention to provide, in a machine tool which has a sliding or reciprocable carriage, extremely simple, inexpensive, and rugged supporting and guide means for the carriage which will accurately position the carriage as desired.

Another object of this invention is to provide simple and inexpensive, yet effective, means for moving the carriage to its selected positions quickly, accurately, and with ease on the part of the operator of the machine.

Various other objects will be apparent.

According to this invention, there is provided a machine tool in which a movable carriage head is moved relative to a fixed head by a hydraulic arrangement. The movable head is supported for movement by means of a pair of rods which serve as the pistons of hydraulic cylinders which carry them. Preferably, a pair of these rods are provided and they extend in opposite directions into fixed cylinders, the movable head being moved back and forth between the opposed pairs of cylinders by movement of the supporting piston rods relative to the cylinders in which they are disposed. The piston rods are fitted into the cylinders in a novel manner which requires a minimum of precision fitting and a novel self-lubricating bearing and sealing arrangement is provided between each cylinder and its associated rod.

In the accompanying drawings, the preferred embodiment of this invention is illustrated, but it is to be understood that specific details thereof may be varied without departing from basic principles.

Figure 1:
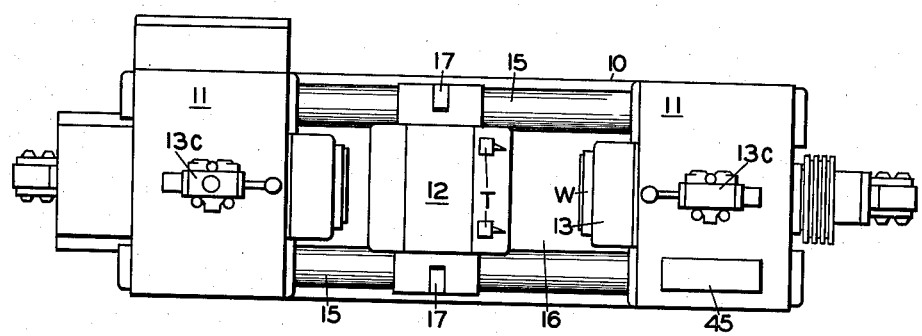
Figure 1 is a top plan view of a boring machine in which this invention is embodied.
Figure 2:
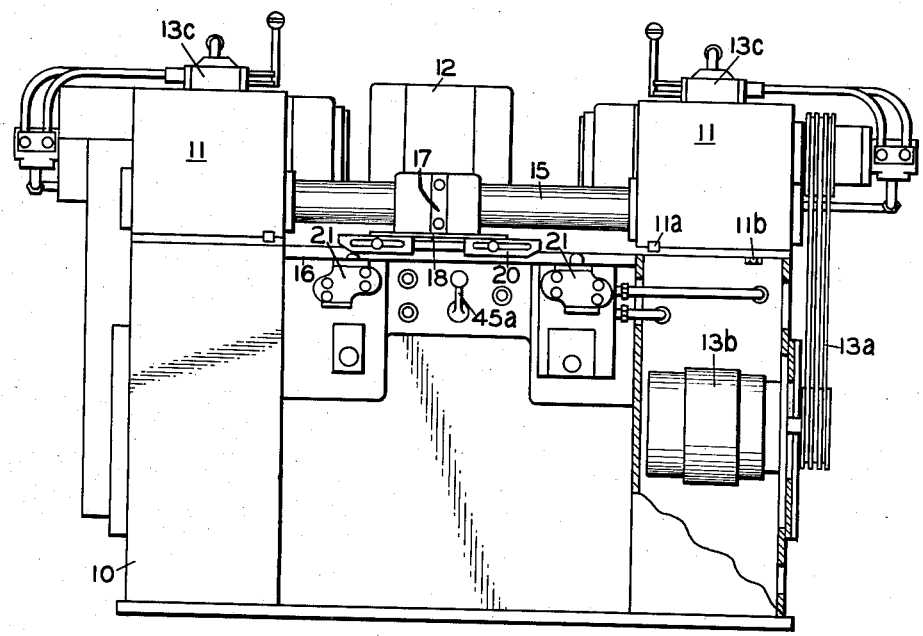
Figure 2 is a side elevational view partly broken away of the machine of Figure 1.

With reference to the drawings, in Figures 1 and 2 there is illustrated generally, for example, a boring machine in which my invention is embodied. This machine is shown as comprising a base or bed 10 having the upstanding fixed heads or housings 11 at the opposite end thereof between which a head or carriage 12 is mounted for movement in opposite directions between the fixed heads 11. Each head 11 has a flat lower surface which rests upon and is fixed in position on the plane upper surface 16 of the bed 10 by means of lugs 11a and bolts 11b.

The heads 11 at their inner sides may support the work W by suitable collet chucks 13 and the movable carriage 12 may support the tools T at the opposite sides thereof within tool-enclosing hoods at each side of the carriage, the hoods being movable with the carriage over the chucks 13. However, it is to be understood that this invention is not limited to this arrangement but that the tools may be carried by the fixed heads 11 and the work by the movable carriage 12. Each of the work-holding chucks 13 may be driven by a suitable drive, which may include the belt and pulley arrangement 13a driven by an electric motor 13b in the base 10. The collet chucks 13 may be operated hydraulically in the usual manner by means including the control valves 13c.

The carriage 12 is supported by two equal diameter rods 15 which are disposed in parallel relationship longitudinally of the machine and which extend in opposite directions into the fixed heads 11 in which they are slidably mounted. They are disposed with their axes in a single horizontal plane which is spaced above and parallel to the plane upper surface 16 on the bed 10 between the fixed heads 11 as shown in Figure 2. The carriage 12 is mounted on the rods 15 in fixed position midway of the length thereof. The carriage may be fixed to the rods by various means but in the drawings this means is indicated generally as a pair of clamps 17 of a suitable type to clamp the carriage to the respective rods 15. Connected to the carriage 12 at its lower side is a horizontal plate 18 which is spaced slightly above the plane surface 16. This plate 18 at each end has adjustably mounted thereon a decelerating cam 20 which cooperates with the plunger of an associated decelerating valve 21 which will decelerate movement of the carriage 12 in the usual manner as the work and tool are brought together.

Figure 3:
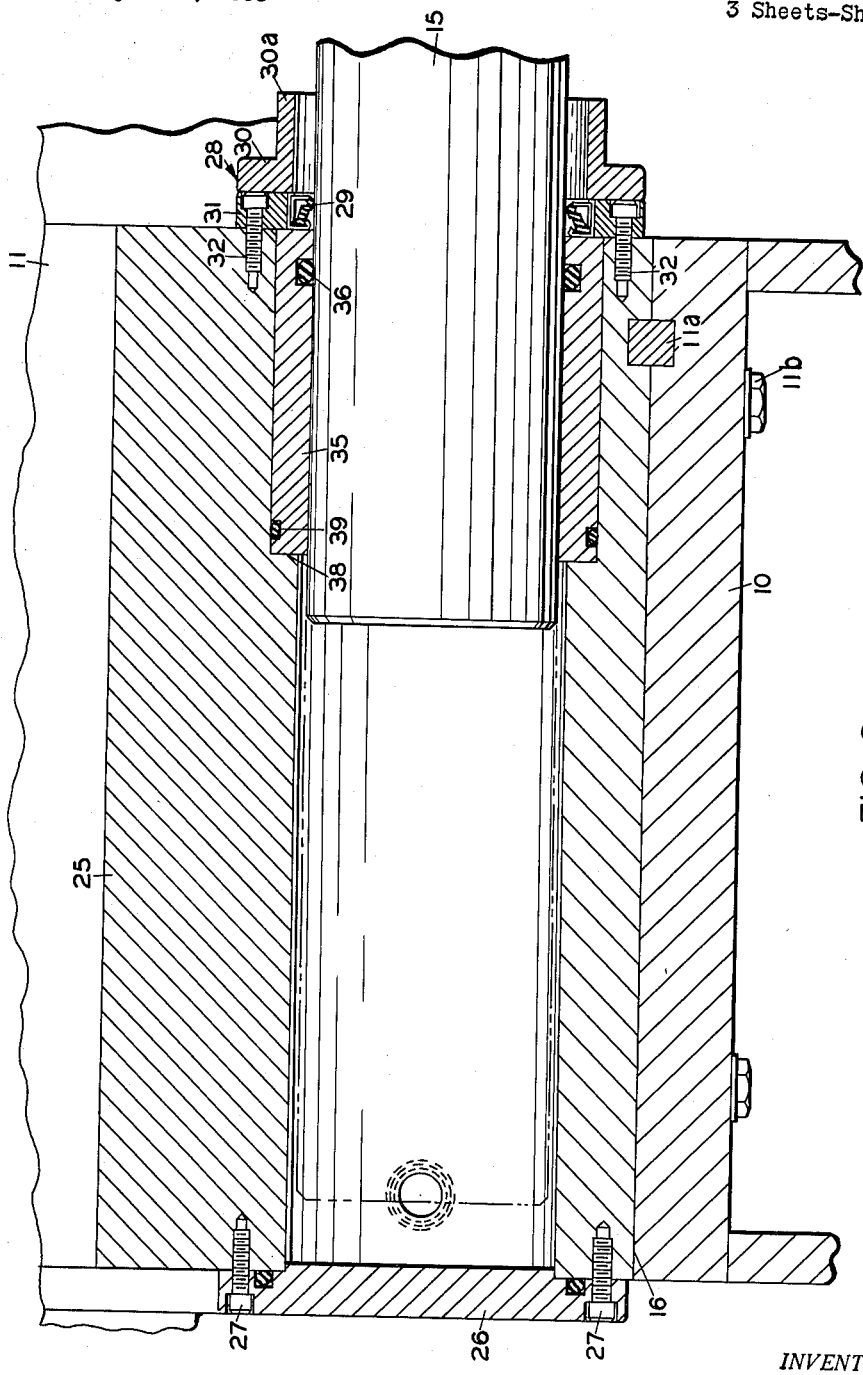
Figure 3 is an enlarged detail in vertical section showing one of the hydraulic cylinder and piston units.
Figure 4:
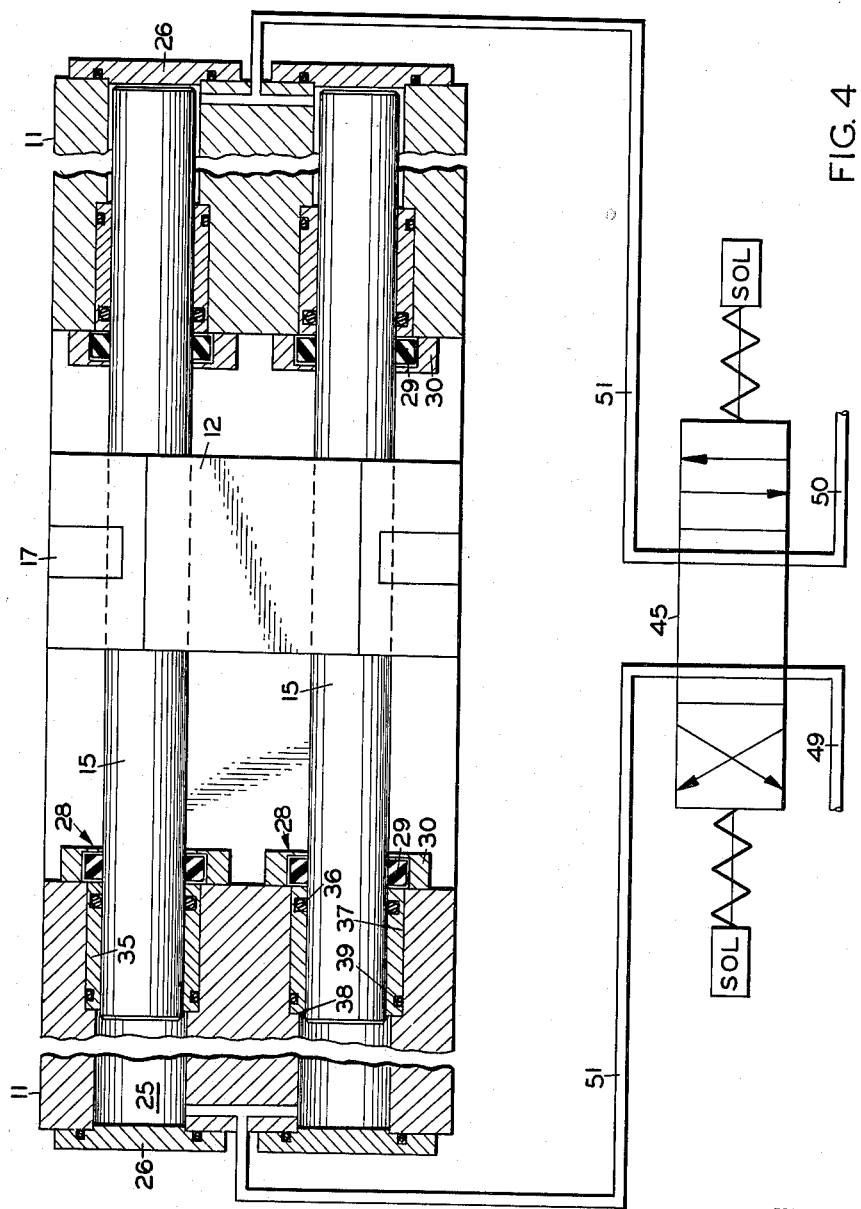
Figure 4 is a schematic view illustrating the means for supporting the movable carriage and the hydraulic arrangement for moving it in either direction longitudinally of the machine.

As shown in Figures 3 and 4, each end of each rod 15 extends into a hydraulic cylinder 25 formed in the associated head 11. The cylinders 25 are arranged in pairs in each of the fixed heads 11, the cylinders of each pair having their axes parallel and the cylinders of opposed pairs having their axes in alignment as illustrated best in Figure 4. The hydraulic cylinders 25 are of the one-way acting type and each has its outer end or pressure end closed by a removable cap 26 which is suitably removably mounted thereon to pressure-seal that end by means which may include the removable bolts 27. At the inner end of each cylinder 25, the associated rod extends slidably through a sealing unit 28. The unit 28 comprises a ring-type compressible rod wiper 29 which engages the surface of the rod 15 and which may be fitted within a bushing-retaining collar 31 that is removably secured to the head 11 as by bolts 32. A collar 30 is attached to the collar 31 and has a sleeve-like extension 30a which may receive a flexible sleeve (not shown) to cover the rod 15 and protect it from dirt.

Each rod 15 itself serves as the piston for the cylinder 25 in which it is slidably mounted rather than to have a separate piston. The end of the rod 15 is slidably mounted in the associated cylinder by means of a bearing bushing 35. This bushing 35 closely embraces the rod which is slidable therein and is provided with an O ring seal 36 adjacent its outer end which surrounds and seals the rod 15. The bushing 35 is disposed in a slight enlargement 37 of the cylinder bore at the inner end of the cylinder 25 and the bushing-retaining collar 31 engages the outer end of the bushing 35 and keeps its inner end in contact with the annular shoulder 38 at the inner end of the base 37. An O-ring seal 39 is provided between the exterior of the bushing 35 and the surface of the bore enlargement 37 at the inner end of the bushing 35 adjacent the shoulder 38. Thus, the rod 15 will slide in the bushing 35 in which it is fitted but will not engage the wall of the cylinder 25 and, therefore, it will not be necessary to precision-fit the piston rod and its associated cylinder wall. This is due to the fact that the internal diameter of the bushing 35 is substantially less than that of the cylinder bore. Furthermore, the bearing provided by the bushing 35 will be self-lubricating since the hydraulic fluid under pressure, in the closed or pressure end of the cylinder 25 will be forced between the bushing 35 and the associated rod 15 until the O-ring seal 36 is reached. It will be precluded from flowing out between the outer surface of the bushing 35 and the surface of the enlarged bore 37 by means of the O-ring seal 39.

A suitable hydraulic control system is provided for simultaneously activating both rods 15 by the opposed pairs of one-way acting hydraulic cylinders 15. A suitable system is illustrated diagrammatically in Figure 4 and includes a manually operable directional control valve 45. This valve is of the usual four-way reversing type and is actuated by means of solenoids controlled by an electric switch 45a (Figure 2) on the machine. Tank and pressure lines 49 and 50, respectively, connect to the valve. Lines 51 lead from opposite ends of the valve to each pair of opposed cylinders 25.

Thus, by manipulation of the switch 45a, the carriage 12 may be moved back and forth with the rods 15 which will slide relative to the fixed heads 11. The tools T, on the carriage 12, consequently, can be moved alternately into association with the work W carried by the opposed chucks 13.

The rods 15 provide a simple rugged supporting and moving means for the carriage 12 whereby the tool and work can be brought accurately into proper cooperation and the tool can be fed into the work. By using the piston rods 15 as the carriage support, the machine is greatly simplified and precisely machined guideways and cooperating guides are not necessary. Also, since the rods 15 serve as pistons and are mounted in the bushings 35, the only fitting necessary is at these bushings and not with the walls of the cylinders. The bearings provided by the bushings 35 are automatically lubricated by the pressure fluid in the cylinders which move the piston rods.

Although many advantages of this machine have been discussed, others will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A machine tool comprising a supporting base having opposed heads, each of said heads including a plurality of cylinders with their axes disposed in parallel relationship, the axes of the cylinders in opposed heads being in axial alignment, rods extending into the aligned cylinders of opposed heads and being slidably mounted therein, a carriage fixed to said rods between said heads and being movable therewith, said movable carriage and said heads carrying the work and tools to be brought into cooperative relationship by movement of said carriage, each of said cylinders being a single-acting cylinder having means connected thereto for supplying hydraulic fluid at its pressure end, and the opposite open end having the rod extending therefrom for supporting the carriage, said rod being slidably fitted in a bushing disposed towards the open end of the cylinder so that the hydraulic fluid in the pressure end thereof will lubricate the bushing.

2. A machine tool according to claim 1 in which the bushing is of smaller internal diameter than that of the cylinder so that the rod will be spaced from the wall of the cylinder.

3. A machine tool comprising a supporting base having opposed heads, each of said heads including a plurality of cylinders with their axes disposed in parallel relationship, the axes of the cylinders in opposed heads being in axial alignment, rods extending into the aligned cylinders of opposed heads and being slidably mounted therein, a carriage fixed to said rods between said heads and being movable therewith, said movable carriage and said heads carrying the work and tools to be brought into cooperative relationship by movement of the said carriage, and a hydraulic control system for selectively supplying hydraulic fluid to the cylinders of one head and withdrawing it from the cylinders of the other head.

4. A machine tool comprising a supporting base having opposed heads, each of said heads including a plurality of cylinders with their axes disposed in parallel relationship, the axes of the cylinders in opposed heads being in axial alignment, rods extending into the aligned cylinders of opposed heads and being slidably mounted therein, a carriage fixed to said rods between said heads and being movable therewith, said movable carriage and said heads carrying the work and tools to be brought into cooperative relationship by the movement of the carriage in opposite directions alternately into cooperation with each of said heads, each of said cylinders being a single-acting cylinder having means connected thereto for supplying pressure fluid at its pressure end and the opposite end having the rod extending therefrom for supporting the carriage, said rod being slidably fitted in a bushing disposed towards the said opposite end of the cylinder which is of smaller diameter than that of the cylinder to provide clearance between the rod and the wall of the cylinder.

5. A machine tool comprising a supporting base having opposed heads, each of said heads including a plurality of cylinders with their axes disposed in parallel relationship, the axes of the cylinders in opposed heads being in axial alignment, rods extending into the aligned cylinders of opposed heads and being slidably mounted therein, a carriage fixed to said rods between said heads and being movable therewith, said movable carriage and said heads carrying the work and tools to be brought into cooperative relationship by the movement of the carriage in opposite directions alternately into cooperation with each of said heads, each of said cylinders being a single-acting cylinder having means connected thereto for supplying pressure fluid at its pressure end and the opposite end having the rod extending therefrom for supporting the carriage.

6. A machine tool comprising a supporting base having opposed heads, each of said heads including a plurality of cylinders with their axes disposed in parallel relationship, the axes of the cylinders in opposed heads being in axial alignment, rods extending into the aligned cylinders of opposed heads and being slidably mounted therein, a carriage fixed to said rods between said heads and being supported by and movable therewith, said movable carriage and at least one of said heads carrying the work and tool to be brought into and out of cooperative relationship by the movement of the carriage in opposite directions, each of said cylinders being a single-acting cylinder having means connected thereto for supplying pressure fluid at its pressure end and the opposite end having the rod extending therefrom for supporting the carriage.

References Cited in the file of this patent

UNITED STATES PATENTS

| | | | |
|---|---|---|---|
| 1,725,489 | Stratton | Aug. 20, | 1929 |
| 1,851,502 | Ferris | Mar. 29, | 1932 |
| 2,000,553 | Alden | May 7, | 1935 |
| 2,550,148 | Harding | Apr. 24, | 1951 |
| 2,720,130 | Chang | Oct. 11, | 1955 |
| 2,859,643 | McIver | Nov. 11, | 1958 |
| 2,863,339 | Emrich | Dec. 9, | 1958 |